(12) United States Patent
Heffelfinger et al.

(10) Patent No.: US 10,893,921 B2
(45) Date of Patent: *Jan. 19, 2021

(54) METHOD OF MAKING A DENTURE WITH NATURE BITE AND WEAR PROPERTIES AND DENTURE

(71) Applicant: Bite Innovations, LLC, Auburn, IN (US)

(72) Inventors: Nathaniel Heffelfinger, Auburn, IN (US); Larry Stoller, Bluffton, IN (US)

( * ) Notice: Subject to any disclaimer, the term of this patent is extended or adjusted under 35 U.S.C. 154(b) by 315 days.

This patent is subject to a terminal disclaimer.

(21) Appl. No.: 15/945,364

(22) Filed: Apr. 4, 2018

(65) Prior Publication Data

US 2018/0221121 A1 Aug. 9, 2018

Related U.S. Application Data

(63) Continuation of application No. 15/486,139, filed on Apr. 12, 2017, now abandoned, which is a continuation-in-part of application No. 14/743,107, filed on Jun. 18, 2015, now Pat. No. 9,655,700.

(51) Int. Cl.
| | |
|---|---|
| *A61C 13/097* | (2006.01) |
| *A61C 13/00* | (2006.01) |
| *A61C 13/10* | (2006.01) |
| *A61C 13/271* | (2006.01) |
| *A61C 13/083* | (2006.01) |
| *A61C 5/20* | (2017.01) |
| *A61C 5/70* | (2017.01) |

(52) U.S. Cl.
CPC ........ *A61C 13/097* (2013.01); *A61C 13/0004* (2013.01); *A61C 13/0024* (2013.01); *A61C 13/083* (2013.01); *A61C 13/10* (2013.01); *A61C 13/26* (2013.01); *A61C 5/20* (2017.02); *A61C 5/70* (2017.02)

(58) Field of Classification Search
CPC .............. A61C 13/097; A61C 13/0001; A61C 13/0004; A61C 13/0024; A61C 13/09
See application file for complete search history.

(56) References Cited

U.S. PATENT DOCUMENTS

| | | |
|---|---|---|
| 4,302,187 A | 11/1981 | Yoon |
| 4,642,052 A | 2/1987 | Carlson |
| 5,678,993 A | 10/1997 | Jeffer et al. |
| 6,056,546 A | 5/2000 | Van Handel |

(Continued)

FOREIGN PATENT DOCUMENTS

| | | |
|---|---|---|
| CN | 102178564 A | 9/2011 |
| CN | 103770223 A | 5/2014 |

OTHER PUBLICATIONS

Joanne M. Livaditis et. al., The Use of Custom-Milled Zirconia Teeth to Address Tooth Abrasion in Complete Dentures; A Cliniical Report, 22 Journal of Prosthodontics 208-213, published 2013, passim.

(Continued)

*Primary Examiner* — Nicholas D Lucchesi
(74) *Attorney, Agent, or Firm* — George Pappas; Barrett McNagny LLP (57) ABSTRACT

The present invention to a method of denture manufacture that incorporates CAM-formed occlusal portions made of zirconia, resulting in a natural fit, feel, and wear essentially similar to the wear properties of natural teeth.

20 Claims, 7 Drawing Sheets

(56) References Cited

U.S. PATENT DOCUMENTS

| | | | |
|---|---|---|---|
| 7,153,135 B1 | 12/2006 | Thomas | |
| 7,691,497 B1* | 4/2010 | Brodkin | A61C 13/0022 |
| | | | 428/701 |
| 8,178,012 B1* | 5/2012 | Khan | A61C 13/082 |
| | | | 264/20 |
| 9,655,700 B2* | 5/2017 | Heffelfinger | A61C 13/097 |
| 2005/0112523 A1 | 5/2005 | Massad | |
| 2006/0099552 A1 | 5/2006 | van der Zel et al. | |
| 2009/0104585 A1 | 4/2009 | Diangelo et al. | |
| 2009/0298016 A1* | 12/2009 | Chu | A61C 13/0006 |
| | | | 433/203.1 |
| 2012/0322031 A1 | 12/2012 | Kim | |
| 2013/0101962 A1 | 4/2013 | Howe | |
| 2013/0316302 A1 | 11/2013 | Fisker | |
| 2014/0272800 A1* | 9/2014 | Howe | A61C 13/0022 |
| | | | 433/199.1 |
| 2015/0182316 A1 | 2/2015 | Morales et al. | |

OTHER PUBLICATIONS

Office Action dated Sep. 8, 2016 in U.S. Appl. No. 14/743,107, Method of Making a Denture With Natural Bite and Wear Properties and Denture by Nathaniel Heffelfinger et. al.

Office Action dated Oct. 5, 2017 in U.S. Appl. No. 15/486,139, Method of Making a Denture With Natural Bite and Wear Properties and Denture by Nathaniel Heffelfinger et. al.

Office Action dated Oct. 5, 2017 in U.S. Appl. No. 15/600,820, Method of Making a Denture With Natural Bite and Wear Properties and Denture by Nathaniel Heffelfinger et. al.

* cited by examiner

METHOD OF MAKING A DENTURE WITH NATURE BITE AND WEAR PROPERTIES AND DENTURE

CROSS-REFERENCES TO RELATED APPLICATIONS

This application is a continuation of U.S. patent application Ser. No. 15/486,139, Method of Making a Denture With Natural Bite and Wear Properties and Denture, filed on Apr. 12, 2017, which is a continuation-in-part of U.S. patent application Ser. No. 14/743,107, Method of Making a Denture With Natural Bite and Wear Properties and Denture, filed on Jun. 18, 2015, and incorporates both of the same in their entirety by reference herein.

STATEMENT REGARDING FEDERALLY SPONSORED RESEARCH OR DEVELOPMENT

Not applicable

BACKGROUND

This invention relates a method of making an artificial full or partial denture with natural bite and wear properties.

Full and partial artificial dentures are well known to the art. A full or partial denture is defined herein as a removable implantable structure overfitting all or part of the upper gums with some or all teeth removed, or all or part of the lower gums with some or all teeth removed, and providing occlusal surfaces that can be used for chewing in lieu of natural teeth.

It is a longstanding goal of dentists and other professionals involved in denture manufacture to create dentures that, when worn, feel and fit as similar as possible to the patient's natural teeth. To obtain this feel and fit, defined herein as "natural," it is necessary to create dentures that, when used, result in a resting jaw position, bite pattern, occlusal contact, and relative tooth movement as similar as possible to that of the patient's natural teeth. This will be referred to herein as the patient's "natural bite." For dentures to maintain a natural bite feel, it is further necessary for artificial teeth within the denture to wear at a rate similar to the wear rate of natural teeth.

The first step in one common method of denture manufacture involves assessment by the dentist of the patient's natural bite or desired bite. Such assessment is typically conducted by measuring the patient's jaw and collecting preliminary impressions of landmark structures in the patient's mouth. These preliminary impressions are used to create a custom impression tray. A denturist or other skilled artisan often makes the custom impression tray. The patient is then fitted with the custom impression tray for more detailed functional impressions of the patient's oral structures, and for assessment of the patient's muscle movements during speech and mastication. The dentist next performs occlusal registration, commonly using wax bite registration, tactile bite registration, intro-oral pin tracing, or gnathometer bite registration techniques. Next, the dentist selects artificial teeth of desired size and shape for attachment to that base. The size and shape of the artificial teeth is selected to most closely replicate the patient's natural or desired bite, as determined by the measurements data collected during the assessment.

The selected artificial teeth are then set in wax try-in base for a test fitting with the patient. Alternatively, the artificial teeth may be removably inserted into a base, such as an acrylic base, intended as the permanent base. The patient provides feedback on the fit and feel of the denture, and the dentist makes any necessary adjustments to the parameters of the base, as well as to the size, shape, and placement of the artificial teeth. Once the patient is satisfied with the look and feel of the try-in denture, a permanent denture is made by attaching the artificial teeth to a permanent base.

As can be seen, manufacturing dentures to achieve a natural bite feel for the patient is a time and labor intensive process. The manufacture of dentures generally involves an iterative process of test-fitting and reshaping, and involve the time of both a dentist and the time of a skilled denturist or other artisan. A patient may require three, four, five, or even more test-fittings before the denture is satisfactorily shaped and sized.

It is known to the art to increase the precision of the denture manufacture process through the use of computer-aided drawing (CAD) software, often linked to milling, cutting, or other shaping machines capable of forming material in accordance with instructions delivered by CAD software. Such machines will be referred to herein as computer-aided manufacture (CAM) machines. For example, it is known to the art to use a haptic device to allow a computer to create a three-dimensional digital CAD model of a denture based on the patient's oral structures. An actual denture replicating the three-dimensional model can then be made using a CAM machine linked to the CAD program. It is also known to the art for the dentist or denturist to use data collected during assessment to create a three-dimensional CAD model of a denture approximating the patient's oral structure, or containing other desired parameters or characteristics. An actual denture replicating the three-dimensional model can then be made using a CAM machine linked to the CAD program. It is also known to the art for the dentist or denturist to fabricate a denture based on information collected during assessment, and then to create a three-dimensional digital model of that actual denture for record purposes, such as through CAD scanning.

It is known to the art to use CAD models, in conjunction with CAM machines, most notably milling machines, to aid in the precise manufacture of custom denture bases, which often include custom-milled sockets to replicate the natural spacing and placement of the patient's teeth. These sockets can then be fitted with selected commercially available artificial teeth, or with custom manufactured artificial teeth. The patient can then undergo the iterative process of test-fitting, providing feedback, and further alteration of the denture to achieve proper occlusion and a satisfactory overall feel.

It is known to use plastic as a material for artificial teeth. Plastic artificial teeth are commonly available, relatively inexpensive, and easy to shape and otherwise work with. Plastic teeth can also be easily made with to resemble real teeth. Plastic artificial teeth suffer two notable drawbacks. First, plastic artificial teeth are molded, and thus are not consistently sized. Plastic teeth are commonly made from molds with a long service life. Over the course of the mold's service life, material from the wall of the mold wears away, resulting in an increase in the size of the mold cavity. A plastic tooth made from a mold that has been in service for ten years will therefore commonly be larger than a plastic tooth made from that same mold when the mold was new. Additionally, molds contain multiple cavities, and the mold-to-mold wear is not necessarily uniform. Thus, while a dentist may select artificial teeth of a certain purported size based on the listed size of the mold used to make it, the actual size of the tooth may vary from the listed size specifications, even if the same mold is used over time. This variation and uncertainty increases the likelihood that the denture will not be ideally shaped or sized immediately upon adding the artificial teeth, and increases the likelihood that adjustments will be required. Second, plastic teeth wear at significantly quicker rate than natural teeth or teeth restored using porcelain or metal materials. Over time, as the plastic teeth wear more rapidly, any natural bite feel accomplished by the original denture can be altered or lost.

It is known to the art to address the problems posed by the inconsistent sizing and rapid wear of plastic artificial teeth by using metal occlusal inserts, crowns, or overlays. These inserts, crowns, or overlays, however, have poor esthetics and ruin the appearance of real teeth that many patients desire from dentures.

The present invention is directed to a method of denture manufacture that incorporates CAM-formed occlusal inserts, crowns, or overlays made of zirconia (also referred to herein as zirconium). Embodiments of the present method are used to manufacture dentures that are more easily shaped and sized to create a natural bite feel, allow the use of plastic artificial teeth, retain the esthetics of natural teeth, and prevent uneven wear between the artificial teeth and the patient's pre-existing natural or restored teeth. Generally, embodiments of the present invention include a method comprising the steps of:

a. Evaluating a patent to determine desired denture parameters;

b. Fabricating a first denture according to those desired denture parameters, the first denture including at least one occlusal portion;

c. Electronically storing the three-dimensional shape and size of the first denture;

d. Forming a holding area within at least one of the occlusal portions of the first denture;

e. Preparing a zirconium occlusal insert for attachment to the holding area, where the occlusal insert is sized and shaped to create a denture approximating the desired denture parameters when mated to the first denture; and f. Attaching said occlusal insert to said holding area to create a useable second denture, where the second denture approximates said desired denture parameters.

Alternately, embodiments of the present invention include a method comprising the steps of:

a. Evaluating a patent to determine desired denture parameters;

b. Fabricating a first denture according to those desired denture parameters, the first denture including at least one occlusal portion;

c. Electronically storing the three-dimensional shape and size of the first denture;

d. Preparing at least one tooth within the denture to receive a crown;

e. Preparing at least one zirconium crown for attachment to the prepared tooth, where the zirconium crown is sized and shaped to, when attached to the corresponding prepared tooth, create a denture with parameters approximating the desired denture parameters; and f. Attaching said at least one zirconium crown to said prepared tooth to create a useable second denture, where the second denture approximates said desired denture parameters.

Still further alternately, embodiments of the present invention include a method comprising the steps of:

a. Evaluating a patent to determine desired denture parameters;

b. Fabricating a first denture according to those desired denture parameters, the first denture including at least one occlusal portion;

c. Electronically storing the three-dimensional shape and size of the first denture;

d. Preparing at least one tooth within the denture to receive an overlay;

e. Preparing at least one zirconium overlay for attachment to the at least one prepared teeth, where the zirconium overlay is sized and shaped to, when attached to the corresponding one or more prepared teeth, create a denture with parameters approximating the desired denture parameters; and f. Attaching said at least one zirconium overlay to said at least one prepared teeth to create a useable second denture, where the second denture approximates said desired denture parameters.

BRIEF DESCRIPTION OF THE DRAWINGS

These and other features, aspects, and advantages of the present invention will become better understood with regard to the following description and accompanying drawings, where.

DETAILED DESCRIPTION

The present invention teaches a method of manufacturing dentures using zirconium occlusal inserts, crowns, or overlays, and dentures made by such methods of manufacture.

Embodiments of the present invention apply equally to full and partial dentures. In all embodiments, the method and denture made using the method incorporate occlusal inserts, crowns, and/or overlays made of zirconia. Zirconia has high thermal resistance, low thermal conductivity, chemical stability, and high fracture strength. It is a high-performance material with excellent biocompatibility and mechanical properties. Zirconia has extreme hardness and wear resistance. Notably, zirconia wears at a rate similar to the wear rate of natural tooth enamel. Zirconia is also colorable and stainable, and can with relative ease be stained to match the esthetics of natural teeth. Zirconia is easily shapeable, and can be readily milled by CAM mills and similar machinery. Zirconia also does not unduly abrade or wear opposing natural teeth.

The first step in manufacturing a denture according to the teachings of the present method is determining the desired parameters of the denture. Parameters include the overall shape and size of the denture and the shape, size, and relative location and orientation of each denture component, including the base, the teeth, and any occlusal inserts. Preferably, the desired parameters are all of those parameters that relate to obtaining the desired fit and feel when the denture is used by the patient, preferably a natural bite feel.

The determination of desired parameters is preferably reached through evaluation of the patient by a dentist. This is particularly the case when the desired parameters are those that will result in a natural bite feel. Methods of evaluation the patient to determine the desired parameters are well known to the art, and result in the generation of a substantial amount of information about the patient's landmark oral structures, resting jaw position, muscle, jaw, and tooth movement during normal mastication and speech, the spacing and orientation of teeth, and general bite registry and occlusion characteristics. Approximating these parameters when a denture is in use is, as known to those skilled in the art, essential to preserving the preferred and desired natural bite feel.

As known to the art, the dentist may use a haptic bite pad or other electronic device to obtain computer assistance in calculating the desired parameters and modeling the desired denture, from which a physical denture may be made using known techniques such as CAD/CAM or 3D printing. Alternatively, a dentist may evaluate the patient using known methods, may determine desired parameters based on that evaluation with or without computer assistance, and may input selected data or parameters into a CAD or similar computer modeling program to generate a three-dimensional model of the desired parameter denture, from which a physical denture may be made using known techniques such as CAD/CAM or 3D printing. Preferably, the dentist evaluates the patient using known methods, determines desired parameters based on that evaluation with or without computer assistance, and those parameters are used to by the dentist or a denturist to create a physical denture. This physical denture, whether created in the preferred manner or by some other method, will be referred to as a "first denture."

After evaluation of the patient and determination of the desired denture parameters, the next step herein is to fabricate a first denture. A first denture according to the teachings of this invention comprises a base portion with a first side configured to overfit at least a portion of the patient's gums and a second side comprising one or more sockets configured to contain artificial teeth. This base portion is typically made of acrylic. The base portion can be purchased commercially and optionally modified, or, preferably, can be made from stock materials by known methods, such as by CAD/CAM, 3D printing, or by hand, to match as closely as possible the desired parameters.

The step of fabrication of the first denture further includes selecting and inserting artificial teeth into the sockets. These artificial teeth can be custom fabricated or molded to approximate or match the desired parameters, or can be purchased commercially. In preferred embodiments hereof, such artificial teeth are made of plastic, most preferably polymethylmethacrylate plastics. Because the occlusal fit of the finished denture will be determined by a separate occlusal insert, crown, or overlay, the artificial teeth in dentures of the present invention do not need to be selected to result in a first denture precisely matching all of the desired parameters, particularly occlusal parameters. The artificial teeth may optionally be permanently attached to the denture base during this step. Preferably, this is accomplished by adhesive bonding, as would be appreciated by one skilled in the art.

Figure 1:
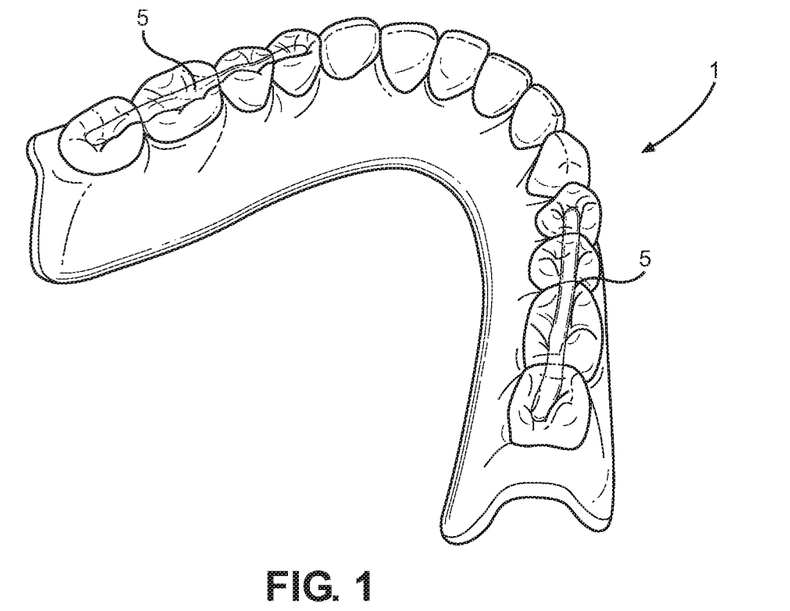
FIG. 1 shows a perspective view of a full denture according to one embodiment of the present invention.
Figure 2:
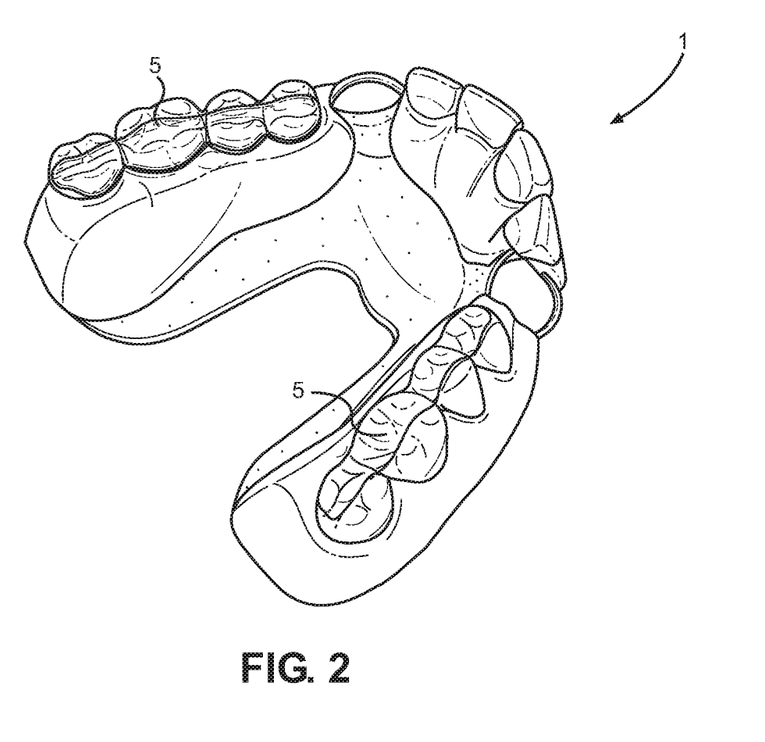
FIG. 2 shows a perspective view of a partial denture according to one embodiment of the present invention.
Figure 3:
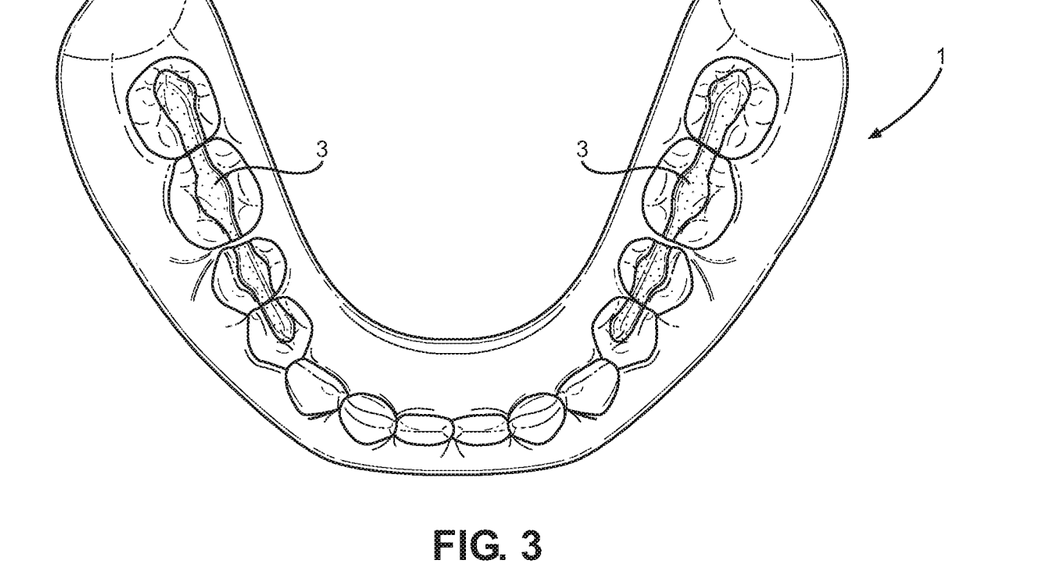
FIG. 3 shows a perspective view of a full denture according to one embodiment of the present invention prior to the step of forming holding areas within the denture.
Figure 4:
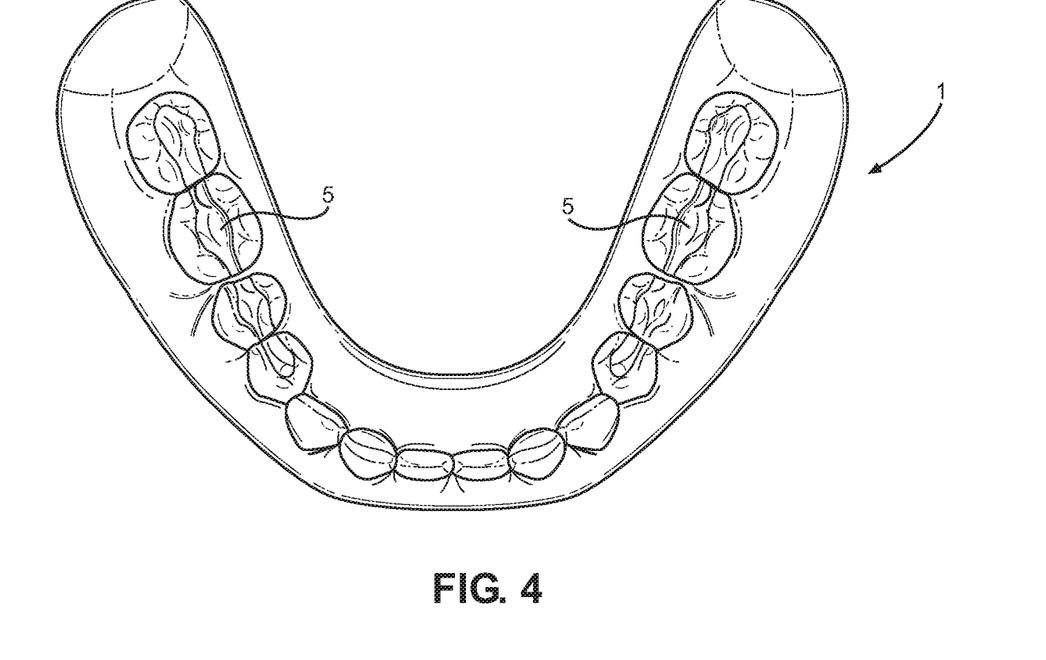
FIG. 4 shows a perspective view of a full denture according to one embodiment of the present invention after the step of forming holding areas within the denture and prior to the step of attaching an occlusal insert.
Figure 5A:
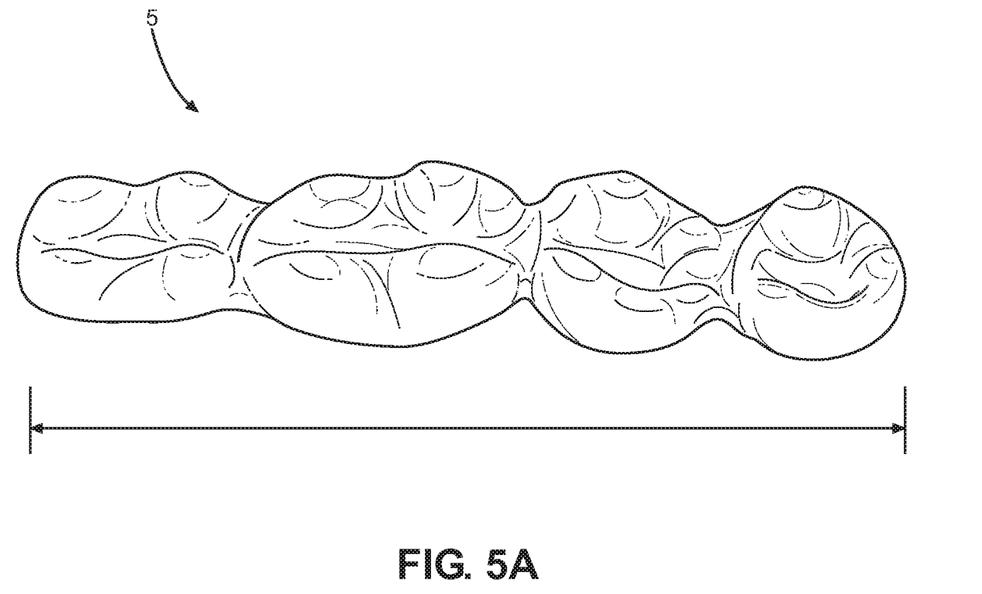
FIG. 5A shows a perspective view of an occlusal insert manufactured according to the one embodiment of this invention prior to the substep of reducing the size by sintering.
Figure 5B:
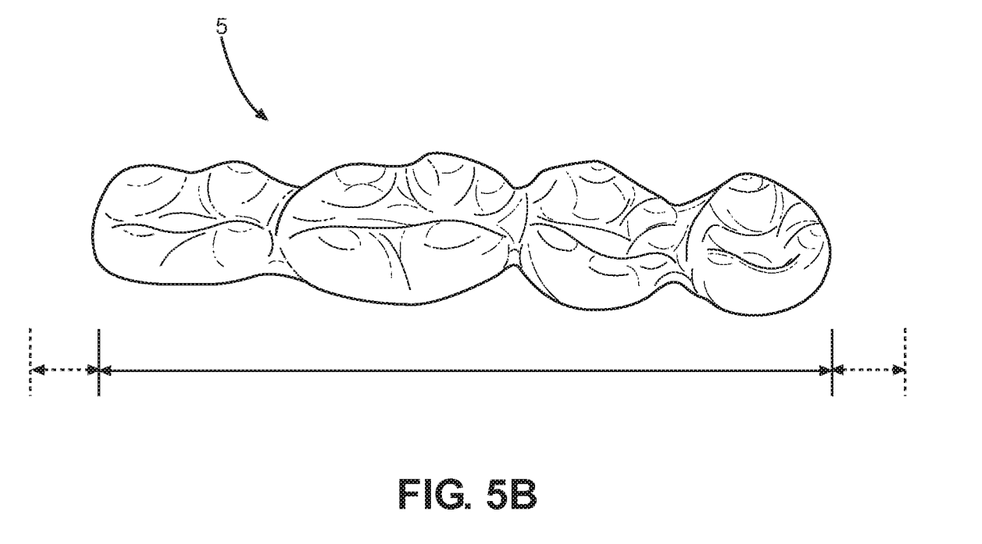
FIG. 5B shows a perspective view of an occlusal insert manufactured according to one embodiment of this invention after the substep of reducing the size by sintering.
Figure 6:
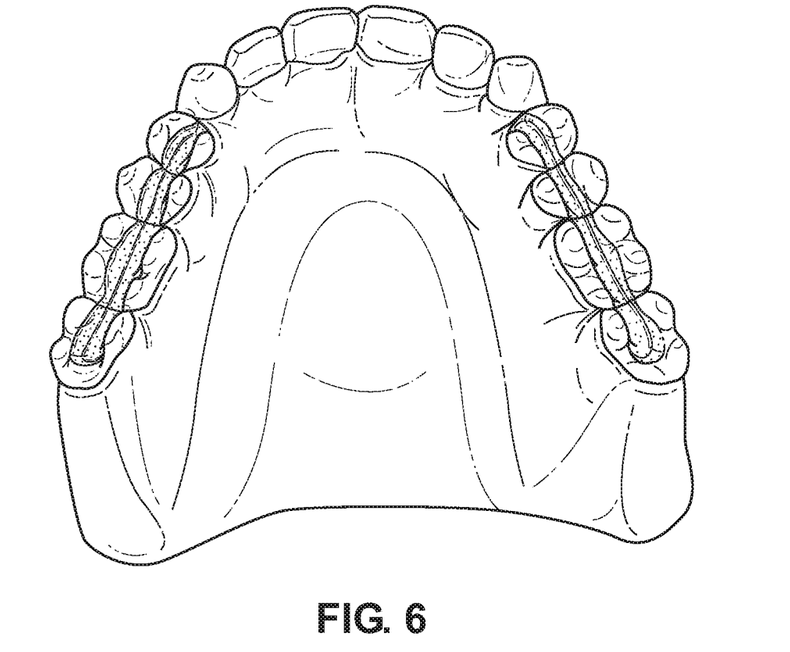
FIG. 6 shows a perspective view of a full upper denture according to the teaching of the present invention after the step of forming the holding areas within the denture and prior to the step of attaching an occlusal insert.
Figure 7:
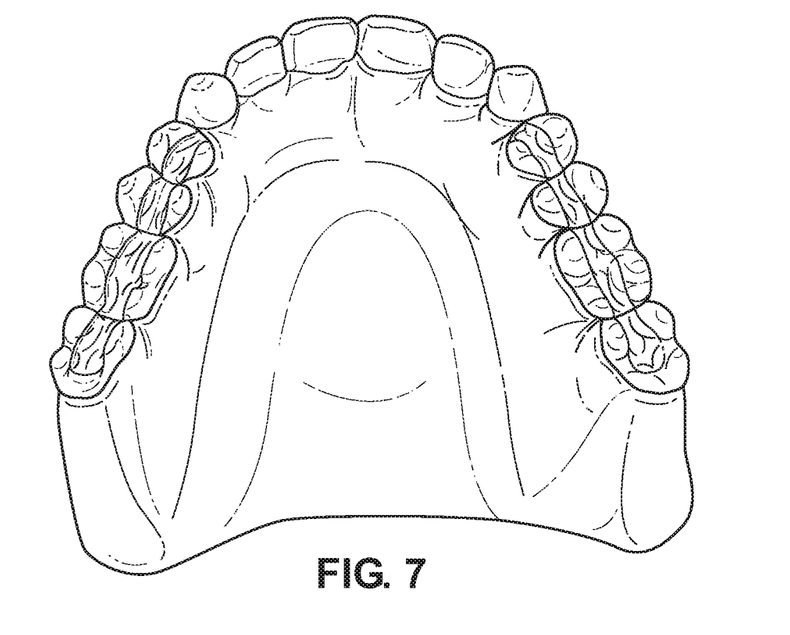
FIG. 7 shows a perspective view of a full upper denture according to the teachings of the present invention.
Figure 8:
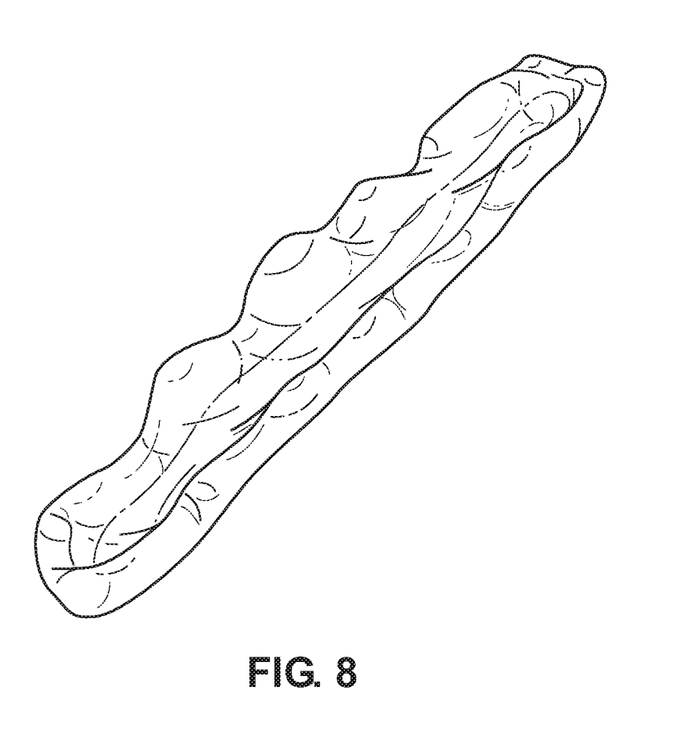
FIG. 8 shows a perspective view of an occlusal insert for an upper denture denture manufactured according to the teachings of the present invention.

The fabricated first denture comprises at least one occlusal portion. The occlusal portion, as that term is used herein, refers to that portion or portions of the surface of the attached artificial teeth that is anticipated be an occlusal surface when the patient uses the denture. The location of the occlusal surface or surfaces will, as would be appreciated, vary on a patient by patient basis depending on the particular characteristics of that patient's oral structures, jaw, jaw musculature, and teeth. Also, depending on whether the denture is upper or lower, and whether it is full or partial, the denture may have one occlusal portion, or may have more than one occlusal portion. The Figures above, and particularly FIG. 3, show common locations for occlusal portions.

After fabrication of the first denture, its three-dimensional size and shape is determined and stored electronically, preferably by use of a CAD scanner in conjunction with a CAD software program. Alternatively, the size and shape of the first denture may be manually inputted into a CAD program or drawn using CAD based on manually determined measurements.

In one embodiment of the present invention, the first denture is then prepared for occlusal inserts by forming one or more holding areas within the denture. These holding areas, as can be seen in FIG. 3, comprise voids or other apertures, and preferably slots, formed into the occlusal portions of the artificial teeth. These holding areas are configured to retain custom-made occlusal inserts. These occlusal inserts will ultimately be inserted be mated with the holding area and permanently bonded there. Holding areas may be formed by a variety of mechanical processes. Holding areas may be cut, milled, drilled, or sanded out of the occlusal portions. The location, size, and depth of the holding area may be determined manually, and the holding area may be formed manually. Preferably, however, particularly given the relatively small size of the holding area, the holding area is milled at a desired location, in a desired shape, to a desired depth, using a CAM mill. As would be appreciated by one skilled in the art, one, two, three, four or more holding areas may be desired to be formed into a first denture. Further, a single holding area may be formed across multiple occlusal surfaces. In that case, the holding area may be formed into both occlusal and non-occlusal surfaces of the first denture. Preferably, after the holding area or areas are formed, the first denture is placed in a CAD scanner once again and a new three-dimensional model is made. In the preferred embodiment hereof, this second three-dimensional model can be compared to the first three-dimensional model to ensure that alignment and orientation of the first denture has not been inadvertently or undesirably altered by the formation of holding areas. If such alteration has occurred, comparison of the first and second three-dimensional models can be used to determine what adjustments should be made to bring the first denture back to the desired alignment and orientation.

In this embodiment, the first denture must represent, as closely as possible, an ideal occlusal relationship prior to the step of preparation of an occlusal insert. As would be appreciated by one skilled in the art, failure of the first denture to represent an ideal occlusal insert dramatically increases the odds that the second denture provided to the patient will not have a satisfactory fit and feel.

In this embodiment, for each holding area, a custom sized and custom shaped zirconium occlusal insert is prepared. Preparation of the occlusal insert includes selecting zirconium stock based on desired color and esthetic characteristics and forming the occlusal insert. The initial size and shape of the occlusal insert is selected so that when the occlusal insert or inserts are completely prepared and fitted within the holding area or areas, the result is a denture with an overall shape, size, and parameters that approximate the desired parameters.

In this embodiment, the occlusal insert is preferably formed by CAM milling from zirconium stock, most preferably by a CAM mill guided by the CAD electronic three dimensional model of the first denture such that the occlusal insert is shaped on one side to mate with the holding area and shaped on the other side to form tooth surfaces that result in a denture with the desired parameters. The CAM mill may be directed to form an occlusal insert of the shape and profile shown by the electronically stored three dimensional image, but oversized to account for shrinkage of the zirconia during the preferred sintering step. Preferably in this embodiment, the occlusal insert is formed approximately 15% to approximately 20% oversized, with the precise degree of oversizing contingent on the specific sintering conditions intended to be used. Most preferably, the occlusal insert is formed approximately 17.8% oversized. In this embodiment, a separate occlusal insert is created for each holding area.

Preferably in this embodiment, the step of preparing the occlusal insert includes sintering the occlusal insert after forming. Sintering improves the properties of zirconia for use as an implant, and particularly improves flexural strength, as would be appreciated by one skilled in the art. Sintering for zirconia used in implants is typically performed at temperatures between 1,300 degrees Celsius and 1,700 degrees Celsius, with the greatest improvement in flexural strength occurring at around 1,500 degree Celsius. In preferred embodiments of the present invention, sintering is performed at temperatures of approximately 1,500 degrees Celsius. Time of sintering is dependent on volume, temperature, and method. Although microwave sintering, conventional sintering, and other sintering methods may be used, the occlusal insert of the present invention is preferably sintered using conventional sintering for between approximately 8 and approximately 12 hours, and most preferably for approximately 10 hours.

Optionally in this embodiment, the step of preparing the occlusal insert may include staining the occlusal insert to a desired shade, color, or tone, such as to match or simulate real teeth. Such staining, as would be appreciated by one skilled in the art, may occur at virtually any stage of the method. Preferably, staining occurs during sintering.

In this embodiment, after the occlusal insert is prepared, it is attached to the first denture by mating the occlusal insert with the holding areas to form a denture that as closely as possible approximates the desired parameters. This denture is referred to herein as a "second denture." It should be noted that the second denture is not a separate structure in this embodiment from the first denture; rather it is the revision of the first denture created by the formation of the holding areas and the attachment of the prepared occlusal inserts to those holding areas. If the occlusal insert does not obtain the desired fit within its corresponding holding area, or if the occlusal insert does not mate with its corresponding holding area to form a second denture that adequately approximates the desired parameters, the occlusal insert may be removed and may undergo further preparation. Such further preparation may include, by way of example, additional sintering, milling, sanding, abrading, cutting, or other shaping.

In this embodiment, after the occlusal insert or occlusal inserts are determined to be suitably prepared, the occlusal insert or occlusal inserts may be permanently attached to the holding areas. Preferably, however, the prepared occlusal insert or inserts are first removably inserted into the holding areas for test-fitting with the patient. During test-fitting the dentist may assess whether the second denture creates the desired fit and feel for the patient, preferably a natural bite feel. The dentist may assess the patient objectively, including recording occlusal patterns or data. The dentist may separately or additionally solicit or accept subjective feedback from the patient concerning the fit and feel of the second denture. Based on this further assessment, the second denture may be further shaped or altered responsively to the assessment, including the patient's preferences and the dentist's judgment of the patient's needs. This test-fitting and revision process may, as would be appreciated, be repeated until the second denture creates a fit and feel satisfactory to the patient and the dentist. This further test-fitting and further evaluation step may optionally and preferably be completed after the occlusal formation substep, but before the sintering substep.

After the second denture is determined to be satisfactory to the patient and the dentist—which preferably but optionally includes the further assessment discussed above—the second denture is finished. In this embodiment, the occlusal insert or inserts are stained, if staining is desired and has not yet been performed, are sintered, if sintering is desired and has not yet been performed, and are permanently attached to the holding area or areas. Such permanent attachment can be accomplished through the use of adhesives or resins, using techniques known to the art. Preferably, permanent attachment is accomplished by cleaning the occlusal insert or inserts and holding area or areas with a solvent such as alcohol, applying a first primer to the surface of the occlusal insert that will contact the surface of the holding area, applying a second primer to the area of the surface of the holding area that will contact the surface of the occlusal insert, applying a bonding agent such as a dual-cure resin cement to both surfaces, attaching the occlusal insert to the holding area in the desired orientation, extravagating excess bonding agent, and allowing the bonding agent to finish curing. A wide variety of adhesives and adhesive attachment techniques may be used within the scope and spirit of this invention.

Figure 9:
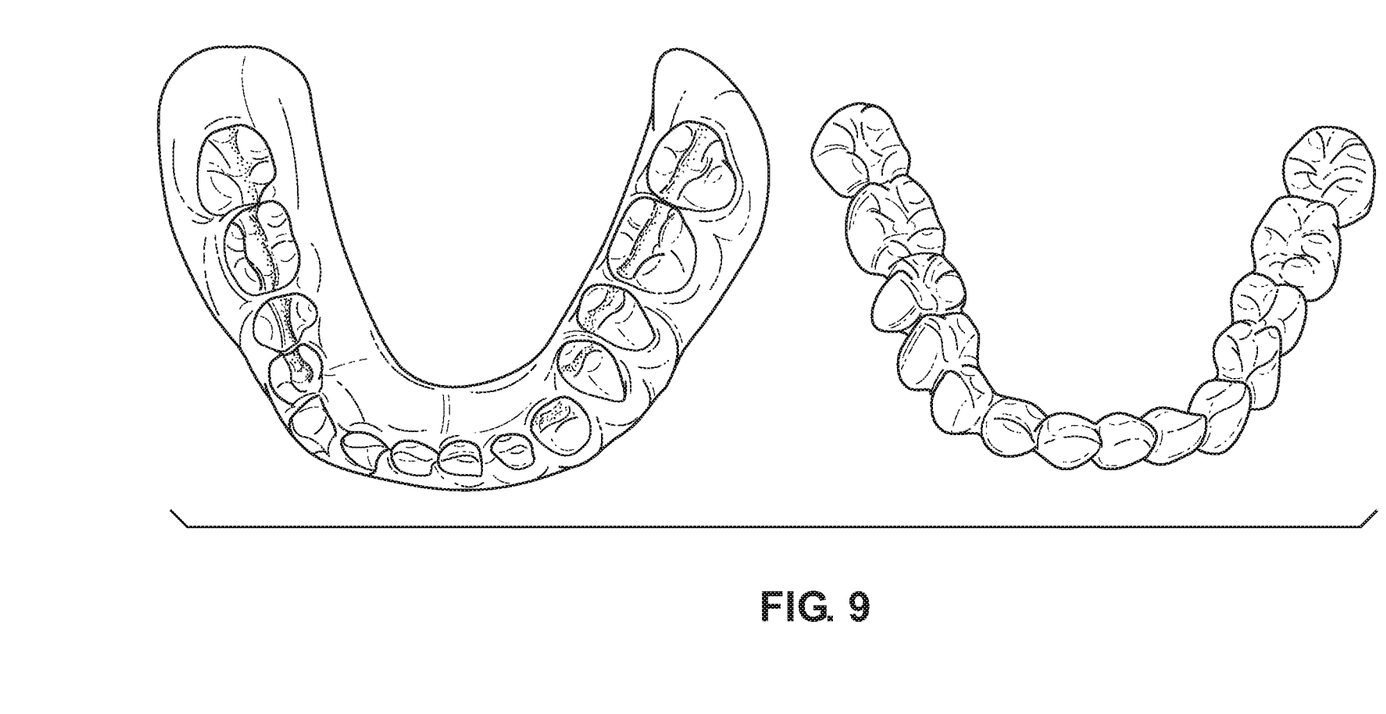
FIG. 9 shows a perspective view of denture prepared to receive zirconium crowns and zirconium crowns prepared for connection to the prepared denture, all manufactured according to the teachings of the present invention.
Figure 10:
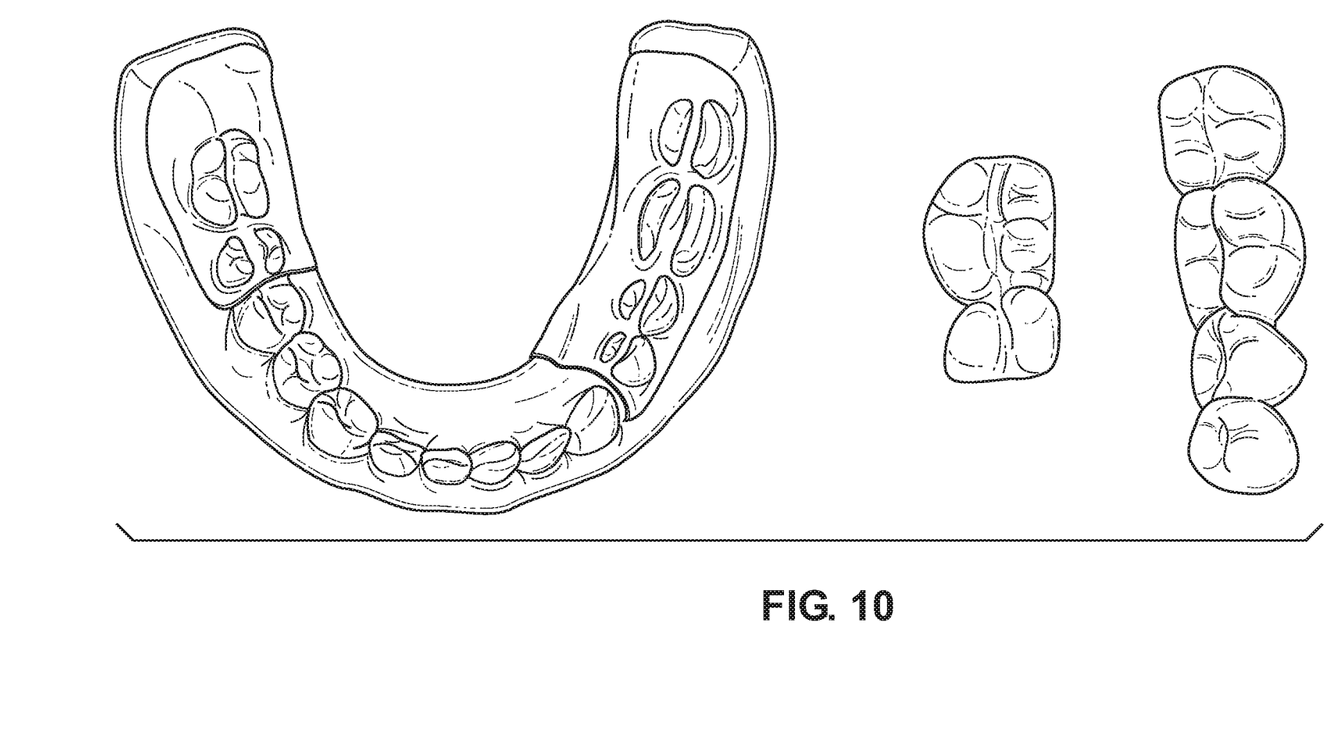
FIG. 10 shows a perspective view of a denture prepared to receive zirconium overlays and zirconium overlays prepared for installation, manufactured according to the teachings of the present invention.

In alternate embodiments, after the step of fabricating the first denture, the method may comprise the step of preparing the first denture for at least one zirconium crown or at least one zirconium overlay (101) by shaping or forming at least one of the artificial teeth of the first denture to receive such a crown (100) or overlay (101). Preferably, at least one artificial tooth is prepared to receive a zirconium crown (100) or a zirconium overlay (101) using a CAM mill. As would be appreciated by one skilled in the art, one, two, three, four, or more artificial teeth may be prepared to receive one, two, three, four, or more crowns, overlays, or mixtures of crowns and overlays. Further, a multiple artificial teeth may be prepared to receive a single zirconium overlay (101). Preferably, after the step of preparing the first denture for at least one zirconium crown (100) or zirconium overlay (101), the first denture is placed in a CAD scanner once again and a new three-dimensional model is made. In the preferred version of this embodiment, this second three-dimensional model can be compared to the first three-dimensional model to ensure that alignment and orientation of the first denture has not been inadvertently or undesirably altered by the preparation to receive at least one crown (100) or overlay (101). If such alteration has occurred, comparison of the first and second three-dimensional models can be used to determine what adjustments should be made to bring the first denture back to the desired alignment and orientation.

In these embodiments, at least one zirconium crown (100), at least one zirconium overlay (101), or a mixture of zirconium crowns and overlays, are fabricated for attachment to the prepared first denture. Fabrication of such crown or crowns, or overlay or overlays, includes selecting zirconium stock based on desired color and esthetic characteristics and forming the crown or the overlay. The initial size and shape of the at least one crown and/or overlay is selected so that when such crown and/or overlay is fabricated and fitted to the artificial teeth prepared to receive it, the result is a denture with an overall shape, size, and parameters that approximate the desired parameters.

In these embodiments, the crown and/or overlay is preferably formed by CAM milling from zirconium stock, most preferably by a CAM mill guided by the CAD electronic three dimensional model of the first denture such that the crown and/or overlay is shaped on one side to mate to the artificial teeth prepared to receive it and shaped on the other side to form tooth surfaces that result in a denture with the desired parameters. The CAM mill may be directed to form a crown and/or overlay of the shape and profile shown by the electronically stored three dimensional image, but oversized to account for shrinkage of the zirconia during the preferred sintering step. Preferably in this embodiment, the crown and/or overlay is formed approximately 15% to approximately 20% oversized, with the precise degree of oversizing contingent on the specific sintering conditions intended to be used. Most preferably, the crown and/or overlay is formed approximately 17.8% oversized.

Preferably in these embodiments, the step of preparing the at least one crown and/or overlay includes sintering after forming. Sintering improves the properties of zirconia for use as an implant, and particularly improves flexural strength, as would be appreciated by one skilled in the art. Sintering for zirconia used in implants is typically performed at temperatures between 1,300 degrees Celsius and 1,700 degrees Celsius, with the greatest improvement in flexural strength occurring at around 1,500 degree Celsius. In preferred embodiments of the present invention, sintering is performed at temperatures of approximately 1,500 degrees Celsius. Time of sintering is dependent on volume, temperature, and method. Although microwave sintering, conventional sintering, and other sintering methods may be used, the occlusal insert of the present invention is preferably sintered using conventional sintering for between approximately 8 and approximately 12 hours, and most preferably for approximately 10 hours.

Optionally in these embodiments, the step of fabricating at least one crown and/or overlay may include staining the crown and/or overlay to a desired shade, color, or tone, such as to match or simulate real teeth. Such staining, as would be appreciated by one skilled in the art, may occur at virtually any stage of the method. Preferably, staining occurs during sintering.

In these embodiments, after the at least one crown and/or overlay is fabricated, it is attached to the first denture by mating the crown and/or overlay with the artificial tooth or teeth prepared to receive each such crown and/or overlay, to form a denture that as closely as possible approximates the desired parameters. This denture is referred to herein as a "second denture." It should be noted that the second denture is not a separate structure in this embodiment from the first denture; rather it is the revision of the first denture created by the preparation of a selected tooth or selected teeth within the first denture, and the attachment of the at least one zirconium crown or overlay to the prepared tooth or teeth. If the attached crown and/or overlay does not obtain the desired fit, or otherwise fails to form a second denture that adequately approximates the desired parameters, at least one crown and/or overlay may be removed and may undergo further preparation. Such further preparation may include, by way of example, additional sintering, milling, sanding, abrading, cutting, or other shaping.

In these embodiments, after the at least one zirconium crown or overlay is determined to be suitably prepared, such crown and/or overlay may be permanently attached to the prepared tooth or teeth. As with other embodiments herein, test-fitting of the second denture may occur prior to final fixation of the crown and/or overlay.

After the second denture is determined to be satisfactory to the patient and the dentist, the second denture is finished. In these embodiments, the crown and/or overlay are stained, if staining is desired and has not yet been performed, are sintered, if sintering is desired and has not yet been performed, and are permanently attached to the holding area or areas. Such permanent attachment can be accomplished through the use of adhesives or resins, using techniques known to the art. A wide variety of adhesives and adhesive attachment techniques may be used within the scope and spirit of this invention.

As will be apparent to one skilled in the art, these embodiments of the method may incorporate one or more than one zirconium crown, one or more than one zirconium overlay, or a mixture of zirconium crowns and overlays that involves one or more of each. Further, as will be apparent to one skilled in the art, these embodiments of the method may be combined with embodiments of the method that utilize occlusal inserts.

Although the present invention has been described in considerable detail with reference to certain preferred versions thereof, other versions are possible. For example, materials, shapes, sized, or configurations other than those described in detail herein may be used for the versions of this invention. Further, the method may include additional steps, intervening steps, or steps performed in an order other than those specified in the embodiments described above. Therefore, the spirit and scope of the claims should not be limited to the description of the preferred embodiments described herein.

What is claimed is:

1. A method for making dentures, said method comprising the steps of:
   a. Evaluating a patent to determine desired denture parameters;
   b. Fabricating a first denture according to said desired denture parameters;

c. Electronically storing a three-dimensional shape and size of said first denture;
d. Preparing at least one tooth for attachment to a zirconia portion;
e. Preparing a zirconia portion for attachment to said at least one tooth,
where each said zirconia portion is sized and shaped to create a denture approximating the desired denture parameters when attached to the said at least one tooth; and
f. Attaching said zirconia portion to said at least one tooth to create a second denture, where said second denture approximates said desired denture parameters.

2. The method of claim 1, further comprising the steps of:
a. Test fitting said second denture to the patient;
b. Assessing the patient; and
c. Shaping a said zirconia portion responsively to said assessment.

3. The method of claim 2, further comprising the step of permanently attaching said zirconia portion to said at least one tooth.

4. The method of claim 3, wherein said step of preparing said at least one tooth comprises milling, cutting, or forming one tooth.

5. The method of claim 3, wherein said step of preparing said at least one tooth comprises milling, cutting, or forming two teeth.

6. The method of claim 3, wherein said step of preparing said at least one tooth comprises milling, cutting, or forming three teeth.

7. The method of claim 3, wherein said step of preparing said at least one tooth comprises milling, cutting, or forming four or more teeth.

8. The method of claim 3, wherein said step of electronically storing the three-dimensional shape and size of said first denture comprises storing the three-dimensional shape and size of said first denture in a CAD program.

9. The method of claim 8, wherein one or more of the step of fabricating a first denture and the step of preparing at least one tooth is performed by a CAM mill.

10. The method of claim 9, wherein the step of preparing a zirconia portion comprises the substeps of:

a. Forming said zirconia portion to a first shape and a first size; and
b. Sintering said zirconia portion to a first shape and a second size, wherein said first shape and second size are selected to create a second denture approximating said desired denture parameters.

11. The method of claim 10, wherein the substep of forming said zirconia portion to a first shape and a first size is performed by a CAM mill.

12. The method of claim 11, wherein said first shape and first size are determined using the electronically stored three-dimensional shape and size of said first denture.

13. The method of claim 12, wherein the substep of sintering further comprises sintering said zirconia portion at approximately 1500 degrees Celsius.

14. The method of claim 13, wherein the substep of sintering further comprises sintering said zirconia portion for between approximately 8 and approximately 12 hours.

15. The method of claim 14, wherein the substep of sintering further comprises sintering said zirconia portion for approximately 10 hours.

16. The method of claim 15, wherein said first size is approximately 15% to approximately 20% larger than said second size.

17. The method of claim 16, wherein said first size is approximately 17.8% larger than said second size.

18. A custom denture with at least one zirconia portion, said denture comprising:
a base portion configured to overfit at least a portion of a patient's gums, said base portion comprising one or more sockets;
plastic artificial teeth attached to said sockets, at least one of said teeth prepared for attachment to a zirconia portion; and
at least one zirconia portion attached to said at least one prepared tooth;
wherein said custom denture has desired parameters.

19. The custom denture of claim 18, wherein said denture is a full denture.

20. The custom denture of claim 19, wherein said denture is a partial denture.

* * * * *

UNITED STATES PATENT AND TRADEMARK OFFICE
CERTIFICATE OF CORRECTION

PATENT NO. : 10,893,921 B2
APPLICATION NO. : 15/945364
DATED : January 19, 2021
INVENTOR(S) : Nathaniel Heffelfinger et al.

It is certified that error appears in the above-identified patent and that said Letters Patent is hereby corrected as shown below:

In the Specification

Column 3, Line 28, delete "patent" and insert --patient--

Column 3, Line 46, delete "patent" and insert --patient--

Column 3, Line 66, delete "patent" and insert --patient--

In the Claims

Claim 1, Line 64, delete "patent" and insert --patient--

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*